United States Patent [19]

Nall

[11] Patent Number: 4,586,407
[45] Date of Patent: May 6, 1986

[54] LATHE TOOL FOR REMOVING AXIAL PERIPHERAL IRREGULARITY FROM SURFACE OF CYLINDRICAL WORKPIECE

[75] Inventor: Lawson H. Nall, Folsom, Calif.

[73] Assignee: Tri Tool, Inc., Rancho Cordova, Calif.

[21] Appl. No.: 567,497

[22] Filed: Jan. 3, 1984

Related U.S. Application Data

[63] Continuation-in-part of Ser. No. 566,421, Dec. 28, 1983, abandoned.

[51] Int. Cl.$^4$ .......................... B23B 1/00; B23B 5/16
[52] U.S. Cl. ........................ 82/1 C; 82/4 R; 82/4 C
[58] Field of Search ............... 82/4 C, 4 R, 1 C; 144/205; 409/300, 175, 297, 140, 165, 166, 175, 178–180, 292; 29/33 A; 30/95, 96, 97

[56] References Cited

U.S. PATENT DOCUMENTS

| | | | |
|---|---|---|---|
| 3,135,850 | 6/1964 | Scheller . | |
| 3,691,881 | 9/1972 | Bachmann | 82/4 C |
| 3,699,828 | 10/1972 | Piatek et al. | 82/4 C |
| 4,084,484 | 4/1978 | Shklyanov et al. | 82/1.2 |
| 4,126,065 | 11/1978 | Clavin | 82/4 C |
| 4,483,223 | 11/1984 | Nall et al. | 82/4 C |

Primary Examiner—Francis S. Husar
Assistant Examiner—Jerry Kearns
Attorney, Agent, or Firm—Bacon & Thomas

[57] ABSTRACT

A lathe-type machine tool for removing axially irregular material from the periphery of a cylindrical or tubular workpiece having a variable peripheral contour on either side of the material to be removed utilizes a chordwise extending set of support arms for a pair of roller guides that are caused to follow eccentricities on the periphery of a workpiece and to provide axially spaced reference points for guiding the cutter element of the tool. The cutter is mounted on a similar chordwise extending support arm that is caused to traverse an imaginary reference line intersecting the aforementioned reference points so that a radially and axially extending irregularity can be removed between the reference points with a smooth transition zone between the reference points. Since the reference points are caused to continuously move around the periphery of the workpiece, the cutter removes material from the periphery of the workpiece between the reference points completely around the periphery of the workpiece. A specific system for supporting the guide elements establishing the reference points is described and a specific system for axially advancing the tool cutter while the cutter moves along the reference line includes a drive clutch arrangement for selectively reversing movement of the cutter and a lost motion connection that permits the cutter to move radially to follow the inclination of the reference line while it is axially advanced along the line by the axial feed drive mechanism.

51 Claims, 16 Drawing Figures

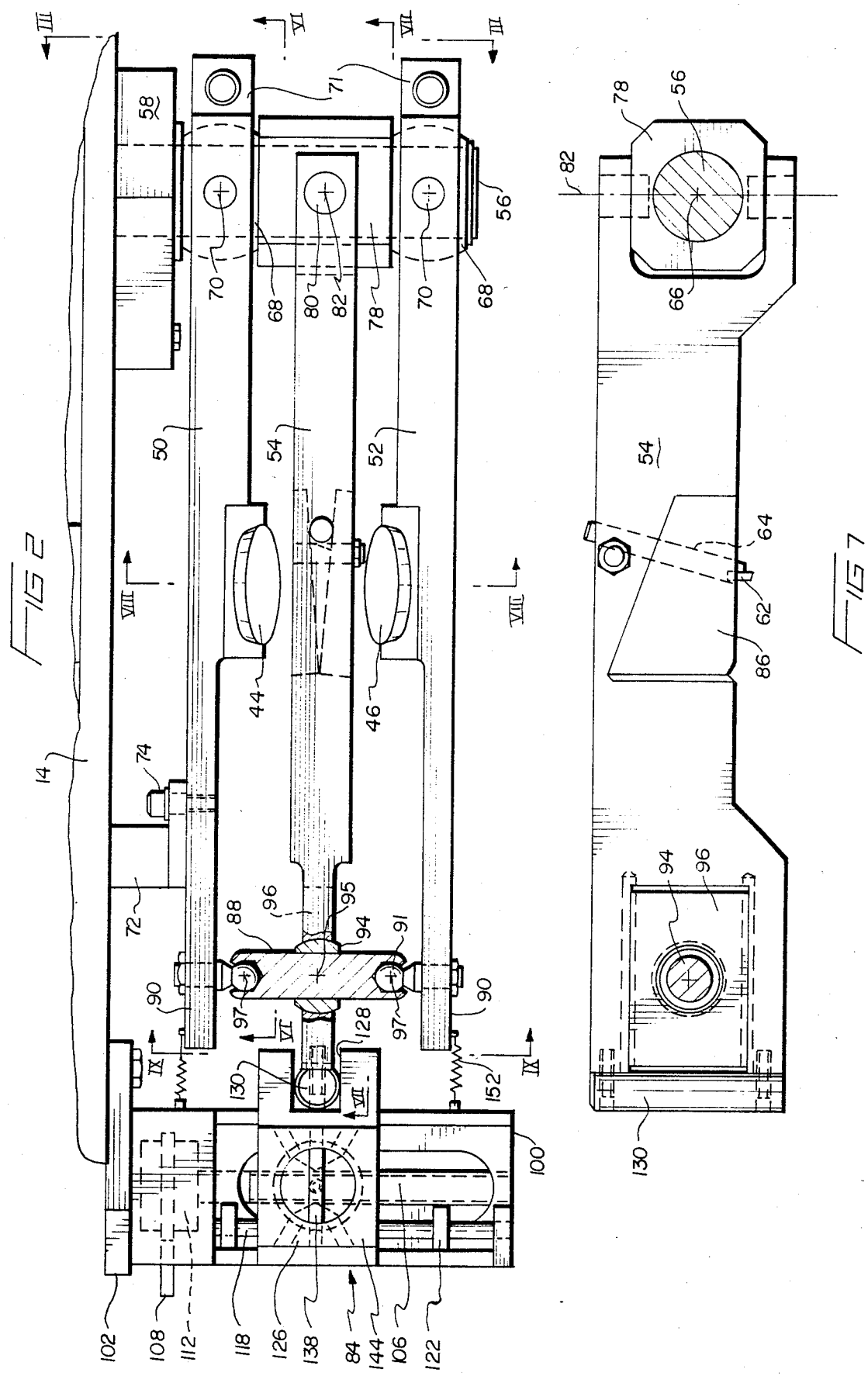

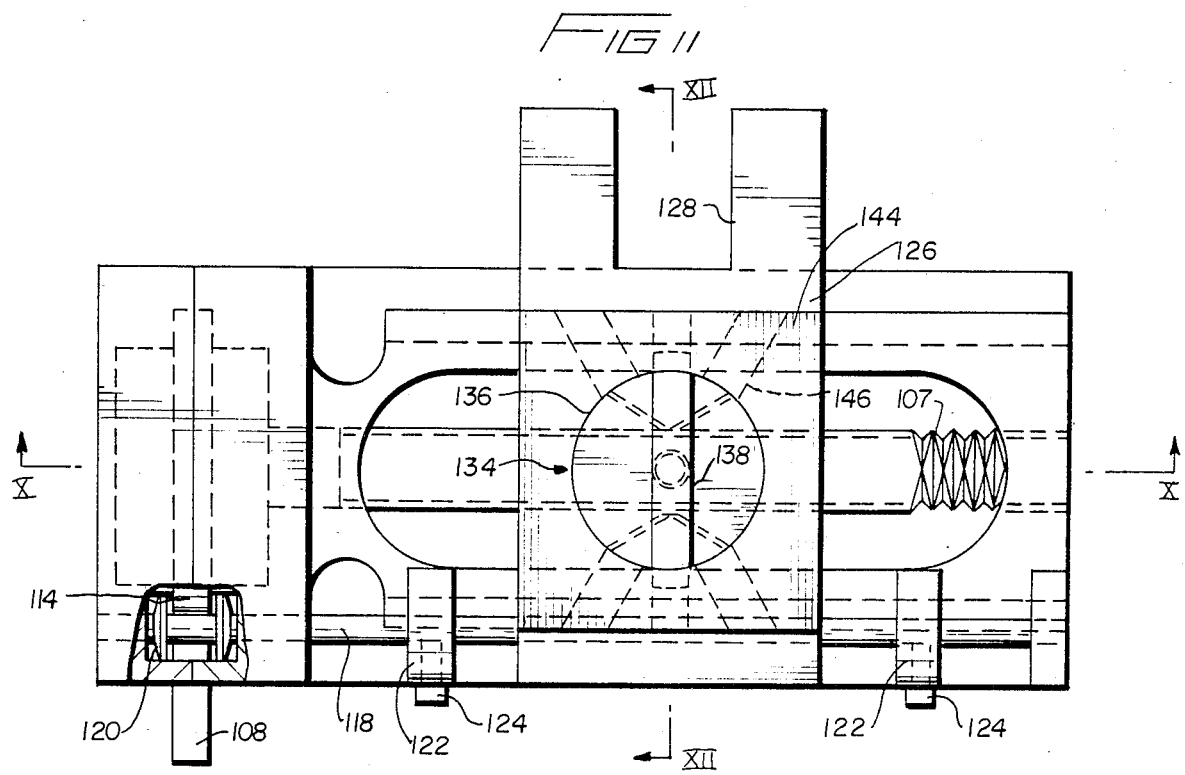
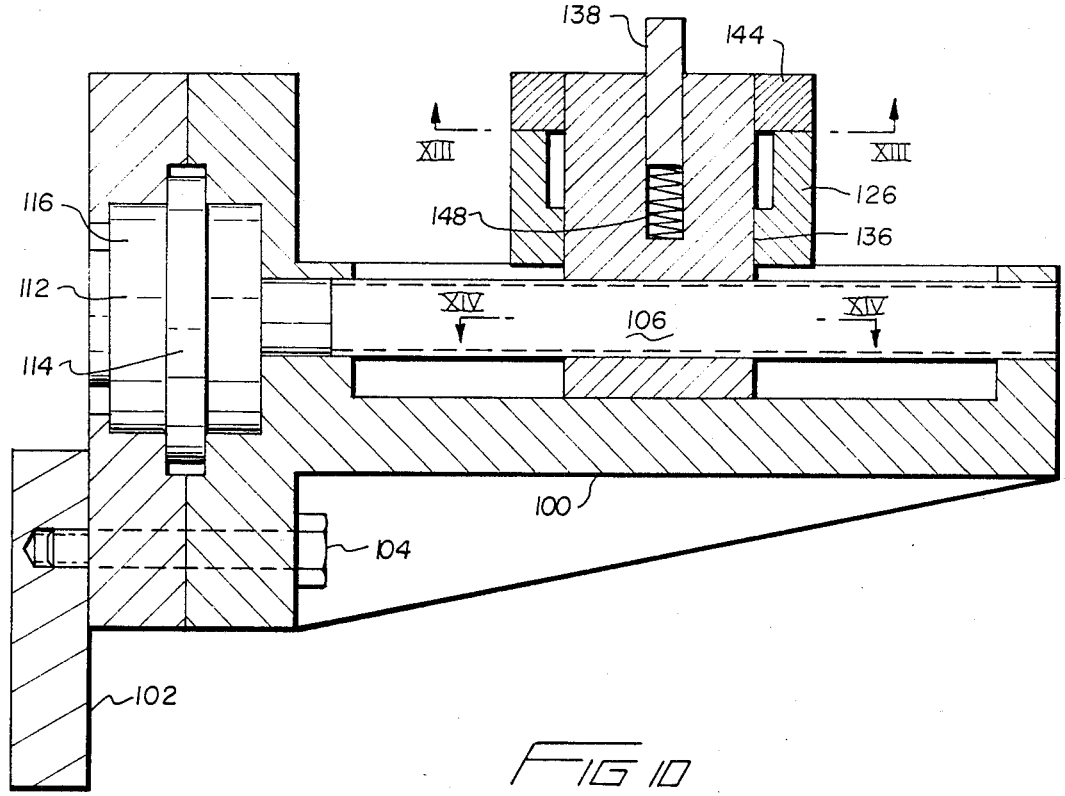

LATHE TOOL FOR REMOVING AXIAL PERIPHERAL IRREGULARITY FROM SURFACE OF CYLINDRICAL WORKPIECE

CROSS-REFERENCE TO RELATED APPLICATION

This application is a continuation-in-part of application Ser. No. 566,421, filed Dec. 28, 1983 (now abandoned) entitled "Lathe Tool for Removing Axial Peripheral Irregularity From Surface of Cylindrical Workpiece" by the applicant named herein.

BACKGROUND OF THE INVENTION

1. Field of the Invention

This invention relates to lathe-type machine tools for machining cylindrical or tubular workpieces.

2. Description of the Prior Art

Lathe-type machine tools adapted to remove material from the periphery of cylindrical or tubular workpieces, including inner and outer peripheral surfaces as well as end surfaces, are generally known in the prior art. They are useful for cutting, beveling, shaping, counterboring and similar machining operations on cylindrical or tubular workpieces, in particular, metallic pipe and tubular stock articles. Machine tools of this type are adapted to be secured on the workpiece itself or the workpiece can be secured relative to the tool by a suitable work holding arrangement. If the tool is attached to the workpiece, it is conventional to use a mandrel or clamp to secure the tool on the workpiece. If the workpiece is secured within the tool housing, the tool itself is usually provided with a suitable centering and clamping arrangement to locate and secure the workpiece at an appropriate position within or on the tool to enable an operator to carry out a precision machining operation on a surface of the workpiece.

It is also conventional in the prior art to construct tools of this genre so they can be divided along a transverse centerline to enable the tool to be opened and then placed around the periphery of a continuous tubular or cylindrical workpiece to enable the tool to be utilized on a continuous length of tubing or pipe without cutting the latter. In typical prior art applications, it is conventional to drive the cutting bit of the tool in an orbital path about the centerline of the tool in a cutting plane that may be selectively advanced axially, depending upon the machining operation to be performed. If the workpiece is to be radially cut or grooved, for example, the tool may perform its cutting operation in a single plane, the plane of the cut or the groove, without any requirement to axially feed the cutter except to precisely locate the cutter at the desired area on the workpiece where the cutting operation is to be performed. On the other hand, if the workpiece is to be machined along an axial portion thereof, it is conventional practice to provide means to axially feed the cutter along the length of the workpiece to thereby move the cutting plane axially along the centerline of the workpiece while the cutting operation is being performed.

While it is the more usual practice in connection with tools constructed in accordance with the above description to drive the cutter around the periphery of the workpiece (around the longitudinal axis of the tool), it is also well-known to hold the cutter at a fixed position while the workpiece is rotated relative to the centerline of the tool, with or without relative axial motion between the cutter and the workpiece. The selection of the design of a particular tool may depend upon the relative sizes of the tool and workpiece and upon the environment in which the machining operation is to be performed.

Whether the cutter of the tool is driven around the workpiece or is held fixed while the workpiece is rotated, it is also known to arrange the cutter to follow the periphery of the workpiece where the workpiece is non-symmetrical around its longitudinal axis. In these circumstances, it is desirable that the cutter be allowed to move relative to the rotary axis of the tool so that it can follow the surface of the workpiece (for example, the inner or outer peripheral surface of a tubular workpiece) rather than a fixed reference axis. Tools of this type will usually include a roller or guide in contact with the surface of the workpiece, with the guide arranged to precisely follow the workpiece contour in the cutting plane of the tool. Usually, the guide is a roller element and is connected to the cutter bit of the tool by an appropriate linkage that enables the cutter to follow the motion of the roller so that the reference point for the cutting operation is the position of the roller as it follows the surface of the workpiece. Cutting tools of this latter variety can be referred to as having a "floating head", with reference to the cutting head which can be envisioned as "floating" around the longitudinal axis of the tool as the cutter and workpiece are relatively rotated around the longitudinal centerline of the tool system.

Specific examples of such "floating head" lathe-type machine tools arranged to perform various cutting operations on tubular workpieces can be observed in U.S. Pat. Nos. 2,842,238, 3,608,406, 3,733,939, and 3,942,248. It will be noted from observing the aforementioned patents that the usual objective of using a floating head in tools of this type is to enable the cutter to follow an eccentric or irregular workpiece while still performing a cutting operation that is uniform along the surface of the workpiece. However, a specific problem that is not seen to be addressed in the prior art concerns the removal of an axial irregularity from the surface of a workpiece by utilizing a floating head, for example the removal of the peripheral crown of a weldment between sections of pipe that have been butt welded together.

Removal of a surface irregularity from tubular workpieces that are perfectly aligned on opposite sides of the irregularity normally would not present any problem for lathe-type machine tools that are known in the prior art. Either a floating head or a fixed head could be used to remove such irregularities by simply axially advancing a cutter along the surface of the workpiece from an axial side of the irregularity to the other side. However, it is rare that the two sections of the workpiece on opposite sides of a weldment are perfectly aligned and symmetrical with each other, and this situation creates a special problem when it is desired to remove the crown of a weld without removing substantially any base metal of the workpieces welded together. It will be recognized immediately that axially feeding a cutter along the workpieces, even with a floating head, cannot be utilized where the workpieces on opposite sides of the irregularity are not precisely axially aligned. A conventional floating head will need to follow either one side of the workpiece or the other, but cannot follow both sides simultaneously.

Prior art lathe-type machine tools, even tools utilizing various forms of floating heads, are incapable of removing peripheral irregularities from cylindrical workpieces, where the peripheral surfaces of the workpiece are not concentric and generally symmetrical on opposite sides of the irregularity. The present invention has for its primary objective and purpose the removal of an axially extending peripheral irregularity from a workpiece that has radial eccentricity on opposite sides of the irregularity. It is distinguishable over all prior art tools in that the cutter of the tool constructed in accordance with this invention can be axially advanced along an imaginary reference line connecting two axial reference points located on the periphery of the workpiece on opposite sides of the irregularity, all while the cutter is advanced around the periphery of the workpiece in a floating head system.

BRIEF SUMMARY OF THE INVENTION

The invention is a rotary, lathe-type machine tool for removing material from the periphery of a generally cylindrical or tubular workpiece having an axially and radially extending irregular peripheral contour by causing a cutter to circumscribe the periphery of the workpiece in a cutting plane while the cutter is advanced axially along the workpiece. The invention is characterized in that the cutter is supported on the tool so that it can follow an axially extending imaginary line connecting two reference points on opposite side of an adjacent the cutting plane of the tool adjacent the cutter holder, the reference points having a fixed geometric correlation with the radial location of the peripheral surface of the workpiece at each of the points. Accordingly, during operation of the tool, the cutter will remove peripheral material from the workpiece along the imaginary line so that radial eccentricity on either side of the cutting plane will not adversely affect the machining operation. In fact, radial eccentricity on either side of the irregularity is precisely tracked by a guide system to establish the reference points on the surface of the workpiece to control axial and radial motion of the cutting tool.

The inventive concept is further characterized in that the cutter is mounted on a chordwise extending arm pivotally mounted to the tool at one end and axially moved along the surface of the workpiece by a feed mechanism engaging the other end of the cutter support arm. The guide system (e.g., rollers) that engage the surface of the workpiece and cause the cutter head to "float" furthermore are mounted on chordwise extending arms that also are pivotable about the same pivot axis as the cutter support arm so that each of the roller arms can independently pivot in a transverse radial plane to establish the two axially separated reference points on the surface of the workpiece to be followed by the cutter.

The cutter is guided while it is axially advanced during a cutting operation by means of a guide link associated with the guide system. The link includes a surface along which the cutter support is advanced, so that the cutter always is axially advanced in fixed relationship with respect to the imaginary line connecting the reference points established by the guide system on the periphery of the workpiece.

Thus, the guide system and the cutter all independently are radially movable about a single pivot axis eccentrically located with respect to the rotary axis of the machine tool (or the workpiece, depending which is rotated with respect to the other), so that the undesired irregularity can be removed by the cutter to establish a finished machined surface that smoothly connects two axially separated areas along the workpiece, regardless of the radial eccentricity of the workpiece at the axial extremities of the machined surface.

The invention also contemplates a unique axial feed means for the cutter so that lost motion is provided in several planes without compromising precision of the cutting operation or of the axial feed motion. More specifically, radial and axial pivotal movement of the cutter support arm of the tool constructed in accordance with this invention is accommodated while the axial feed mechanism moves rectilinearly in a longitudinal direction in a forward or reverse sense. By combining sliding joint connections and universal couplings, the cutter support arm can be axially advanced while it radially and axially pivots to follow the imaginary reference line between the reference points that have been established at axially separated locations on the peripheral surface of the workpiece being machined.

The unique arrangement of the elements embodying the invention enable the tool to be utilized, for example, for the purpose of removing the crowns of weldments joining misaligned or radially eccentric pipe or tube sections, under circumstances where removal of the base metal of the pipes or tubes is impermissible or undesirable. Moreover, the arrangement of the elements embodying the invention enable the tool to be used to remove axial irregularities closely adjacent a curved or elbow section workpiece, an operation that prior art floating head tools have not been capable of conveniently achieving.

DESCRIPTION OF THE DRAWINGS

FIG. 2 is a line taken along line II—II of FIG. 1;

FIG. 7 is an elevation view taken along line VII—VII in FIG. 2;

FIG. 10 is an end sectional view of the axial feed mechanism for the cutter arrangement shown in this preferred embodiment, and is taken along line X—X of FIG. 11;

FIG. 11 is an enlarged, partial cutaway view of the axial feed mechanism shown at the left end of FIG. 2;

DETAILED DESCRIPTION OF THE PREFERRED EMBODIMENT

Figure 1:
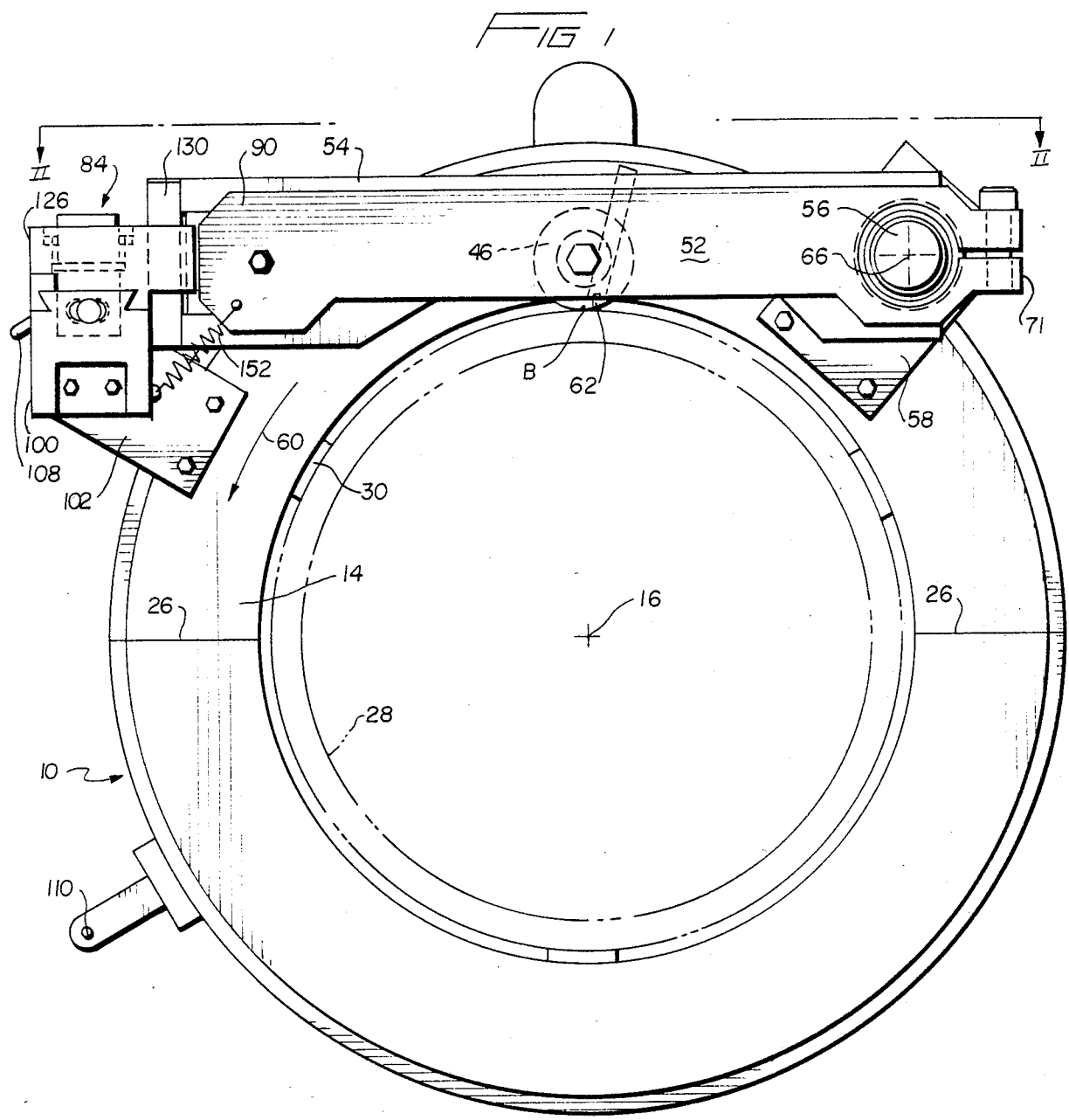
FIG. 1 is an axial end view of a rotary, lathe-type machine tool embodying the present invention.
Figure 3:
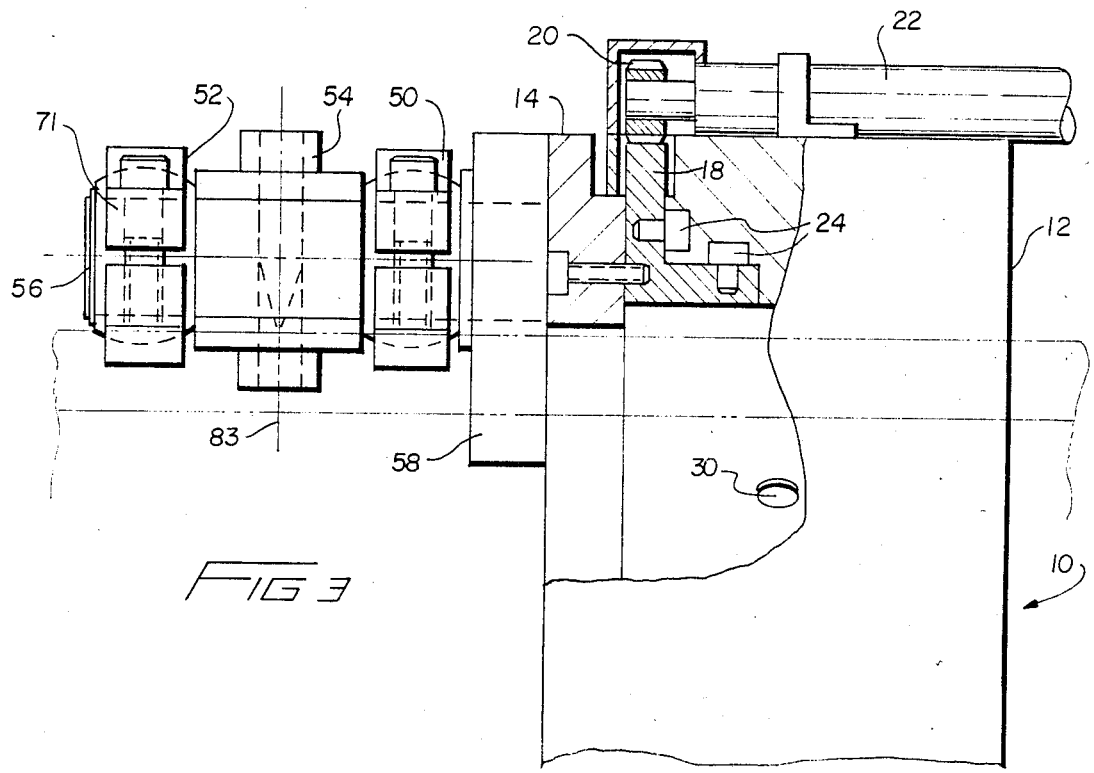
FIG. 3 is a partial cutaway side elevation view of the upper portion of FIG. 1, along a line generally indicated at III—III at FIG. 2.

With reference to FIGS. 1 and 3, a rotary, lathe-type machine tool generally indicated by the numeral 10 comprises an annular housing 12 having mounted on a forward face thereof an annular ring assembly 14 which is rotatable relative to the housing 12 about the longitudinal rotary axis 16 of the tube. The ring assembly 14 includes a ring gear 18 in driving engagement with a driving pinion gear 20 driven by motor 22 fixed to the housing 12. The ring gear 18 is appropriately mounted by suitable bearings 24 to the housing 12, whereby the ring assembly 14 is constrained relative to the housing 12 so that it is limited to rotational movement about axis 16. The bearings 24 in effect react axial and radial loadings transmitted through the ring assembly 14.

Both the housing 12 and the ring assembly 14 are split along line 26, with both halves of the housing and ring assembly preferably hinged at one side so that the entire tool can be opened along the line 26 and placed around a cylindrical workpiece without the need to advance the tool along the workpiece from one end thereof. Suitable hinges and securing bolts (not shown) are provided to maintain the tool in assembled relationship as shown in FIGS. 1 and 3.

Figure 4:
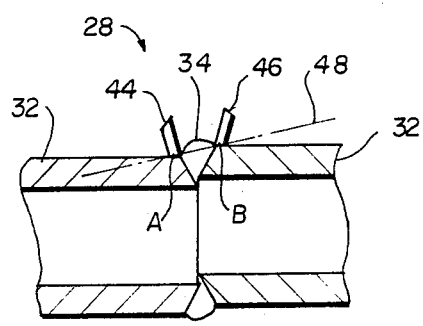
FIGS. 4 and 5 are schematic representations showing the manner in which an imaginary reference line is established between two axially separated reference points located on a peripheral surface of a tubular workpiece, and showing how the guide rollers establish the points on two different workpiece forms.
Figure 5:
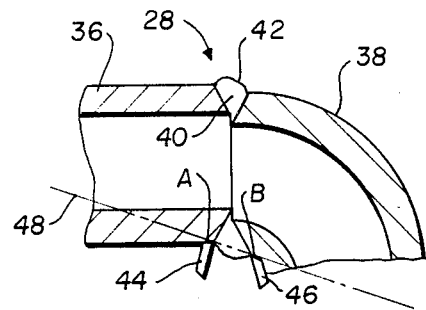

The housing 12 and ring assembly 14 may be supported in fixed relationship by any suitable means (not shown) and a tubular or cylindrical workpiece 28 is centrally located and fixed substantially concentrically with the tool rotary axis 16 by means of locating and fixing elements 30 that radially locate and hold the workpiece relative to the housing 12. The workpiece 28 is schematically illustrated in FIG. 4 as comprising a pair of butt welded tubular sections 32 having an axially irregular peripheral contour 34 resulting from the crown of a weldment joining the sections 32 together, in combination with the axial misalignment of the sections 32. In FIG. 5 there is illustrated another example of a workpiece comprising a tubular section 36 butt welded to an elbow section 38, with a weldment 40 between the sections, the weldment 40 including a crown 42 that extends radially beyond the outer peripheral surface of the sections 36, 38, which are misaligned in this example, as well.

When the workpiece 28 is mounted within the housing 12 of the tool 10, the material to be removed by the tool will be located within the range of movement of the cutting plane of the tool, which is a transverse radial plane extending normal to the tool axis and including the cutter element of the tool, to be described below.

One of the objectives of the invention is to remove an axially extending irregularity from the peripheral surface area of a workpiece, such as the crown portion of a weldment such as shown in FIGS. 4 and 5. However, when the sections of the workpiece on opposite sides of the weldment are eccentric from each other and from their central axes, it is necessary to establish a cutting line that will smoothly remove the weldment without substantially disturbing the base metal. Since the radial location of the base metal on opposite sides of the irregularity to be removed, such as crowns of weldments 34 and 40 in FIGS. 4 and 5, can be located somewhat eccentrically in a radial sense on opposite sides of the irregularity, it would normally present a serious problem to determine the line of the cut to be made to achieve a clean removal of the outer surface of the irregularity without disturbing the base metal around the circumferential perimeter of the workpiece.

In accordance with this invention, as seen in FIG. 5, a pair of axially spaced reference points A and B are established on opposite sides of and adjacent the cutting plane of the tool adjacent the cutter holder, which, if illustrated in FIGS. 4 and 5, would be located between points A and B. The reference points A and B are determined by causing a pair of roller guide elements 44, 46 to contact the peripheral surfaces of the workpieces 32, 36 and 38. The guide rollers are of equal diameter and therefore the location of each roller in its own respective radial plane extending transversely of the longitudinal axes of the workpieces will be an indication of the radial location of each point A and B on the surface of each workpiece as the guide rollers 44 and 46 are caused to move about the peripheral surfaces of the workpieces in orbital fashion. In the specific examples of FIGS. 4 and 5, the guide rollers 44 and 46 would orbit about the workpieces 32, 36 and 38 in a plane extending transverse to the plane of the illustration, all as will be more fully explained in connection with the detailed description of the structure shown in the other views of the drawings.

It will thus be observed that points A and B can be moved about the periphery of the workpieces with the guide rollers 44 and 46, with the radial position of the guide rollers always providing an indication of the radial location of the surfaces of the workpieces at each circumferential location around the perimeters of the workpieces. Each radial eccentricity of the workpiece on opposite sides of the axial irregularities 34 or 42 will be sensed by radial motion of the guide rollers 44, 46 as they orbit around the workpieces in engagement therewith.

Having established points A and B, an imaginary reference line 48 can now be located in space by simply connecting points A and B with an axially extending straight line. It will be observed that the line 48 joining points A and B extends through the axial irregularity 34 and 42 so that, if the irregularities 34 and 42 are removed along the line 48, the resultant peripheral contour of the workpieces 32, 36 and 38 would smoothly transition between points A and B entirely around circumference of the workpieces. In the case of the specific examples illustrated in FIGS. 4 and 5, the smooth transition zone would appear to be a smooth bevel on opposite sides of the weldments 34 and 40, with the bevel smoothly joining the eccentrically connected workpiece segments 32, 36 and 38.

The present invention provides a cutting tool arrangement that can effect a cutting operation along an imaginary reference line 48 connecting a pair of axially spaced reference points A and B located on opposite sides of an axial irregularity, even when the workpiece itself has radial irregularities or eccentricities on opposite sides of the irregularity to be removed. In the specific example illustrated, the axial irregularity is the crown of a weldment to be smoothly and efficiently removed to provide a smooth surface across the weldment without disturbing the base metal of the workpieces.

With reference again to FIGS. 1, and 3, it will be recalled that, in this specific embodiment, ring 14 of the tool 10 rotates about the tool axis 16. In accordance with this embodiment of the invention, a set of three support arms 50, 52 and 54 are located so they extend chordwise of the rotary path of the ring 14. The three arms 50, 52 and 54 are connected to the ring 14 by a pivot shaft 56 that extends longitudinally out from a mounting plate 58 that is rigidly mounted to the ring 14 for rotation therewith. Thus, pivot shaft 56 orbits about the tool rotary axis 16 in a circular orbital path carrying with it the three arms 50, 52 and 54 which move ahead of the shaft 56 when the ring 14 rotates in the direction of arrow 60 (FIG. 1).

Arms 50 and 52 are support arms for the roller guide elements 44 and 46 corresponding to the guide elements 44 and 46 shown in FIGS. 4 and 5. The arm 54 is a support for a cutter 62 and cutter holder 64 mounted on the arm 54.

Figure 6:
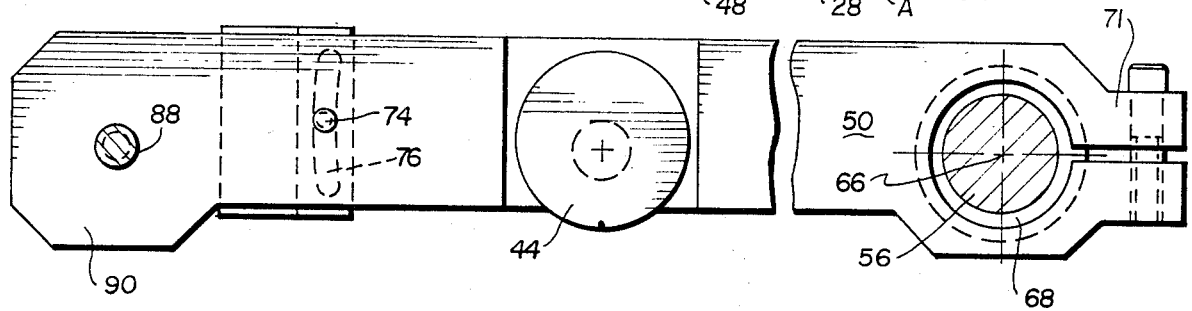
FIG. 6 is an elevation view taken along line VI—VI in FIG. 2.

The guide support arms 50, 52 and the cutter support arm 54 are all pivotably mounted on pivot shaft 56 for radial pivotal movement about pivot axis 66 (see FIGS. 6 and 7). Guide support arms 50, 52 are pivotally attached to the pivot shaft 56 by ball elements 68 that include transverse pins 70 extending outwardly through the proximal ends of the guide support arm 50, 52. The ball elements 68 are fixed axially along the pivot shaft 56 by a suitable assembly means, while they can pivot about the shaft. The proximal end of each guide support arm 50, 52 is secured to its respective ball coupling 68 by a clamp connection 71 that enables each arm 50, 52 to be pivoted about transverse pin 70 to adjust the axial distance between the guide rollers 44, 46. Accordingly, by releasing the clamp 71 and axially pivoting the support arm 52 relative to the arm 50 about pin 70, the axial distance between the guide rollers 44 and 46 can be adjusted to locate points A and B (FIGS. 4 and 5) closely adjacent the material to be removed from the workpiece. Once the clamps 71 are secured, the axial location of arms 50 and 52 remains constant, although the arm can independently radially pivot about the pivot axis 66 as the rollers 44, 46 individually follow the outer peripheral contour of a workpiece 28 located and fixed within the annular opening of ring 14.

In the preferred embodiment, arm 50 frictionally engages a friction block 72 carried by ring 14, against which it is held frictionally by an adjustable set screw 74 whereby the radial pivotal movement of the arm 50 can be damped by frictional contact between the arm 50 and the friction block 72. As shown in FIG. 6, an elongated slot 76 can be provided so that the set screw 74 can travel radially with the arm 50 as it pivots about its pivot axis 66 while it is supported on pivot shaft 56 and while it orbits the workpiece 28. Frictional contact between the contiguous surfaces of the arm 50 and the block 72, as well as between the fastener 74 and the block 72 will provide desirable friction damping to prevent the arm 50 from bouncing from point to point around the periphery of the workpiece 28.

The cutter support arm 54 is also mounted on the pivot shaft 56 by means of a universal joint connection comprising a pivot block 78 and a transverse pin 80 connecting the block 78 to the arm 54. Thus, the arm 54 can radially pivot about the axis 66 on pivot shaft 56 via the pivot block 78 and can also axially pivot about transverse pins 80 about a second transverse pivot axis 82 that extends perpendicular to axis 66 and intersects same, as illustrated in FIG. 7. The pivot block 78 is also axially constrained on the pivot shaft 56 by a suitable assembly technique.

The cutting plane of the tool is that radial, transverse plane including the cutter 62. The cutting plane may or may not extend parallel to the cutter support arm 54, depending upon the position of the latter with respect to its second pivot axis 82. The cutting plane of the tool as illustrated in FIG. 1 is shown at 83 in FIG. 3 and, if illustrated in FIG. 2, would extend centrally through the cutter support arm 54 and through the cutter 62 (see FIG. 7).

During a machining operation, cutter support arm 54 and cutter 62 are driven orbitally about the tool rotary axis 16. The precise radial location of cutter 62 is determined by the radial position of the guide rollers 44, 46 in a manner that will be described below. The axial position of the cutter 62 is determined by an axial feed system 84 shown to the left in FIG. 2 and which also will be described in more detail below. When the axial feed system 84 is operated to axially advance cutter 62 along the axis of the tool 10, cutter support arm 54 is axially pivoted about the second pivot axis 82 so that the cutting plane of the tool is axially advanced between the guide rollers 44 and 46 (upwardly and downwardly as viewed in FIG. 2). Thus, the cutter support 54 can radially pivot about the first pivot axis 66 to follow radial eccentricities of the workpiece 28 and can axially pivot about the second axis 82 to enable the cutter 62 to be axially fed along the rotational axis 16 of the tool.

Figure 8:
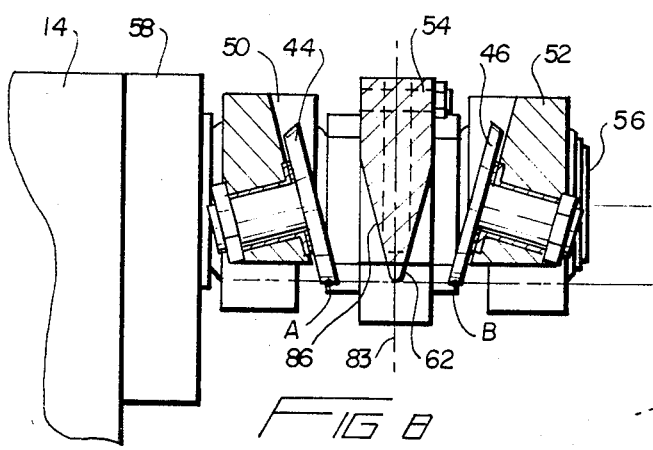
FIG. 8 is an end elevation view taken along line VIII—VIII in FIG. 2.

With reference to FIG. 8, the guide rollers 44, 46 can be clearly observed mounted to their respective guide support arms 50, 52 and disposed on opposite sides of the cutting plane 83. The points of contact between each respective roller 44, 46 and the peripheral surface of the workpiece 28 is illustrated at points A and B, since it is assumed in this view that points A and B are longitudinally aligned in a direction that is substantially parallel to the longitudinal or rotary axis 16 of the tool 10. The rollers 44, 46 are shown to be mounted for rotation about inclined axes so that the peripheral portions of the rollers adjacent the workpiece are closer to each other than the diametrically opposite areas of each roller. Moreover, the adjacent region of the cutter support arm 54 is tapered as shown at 86 to enable the axial locations of rollers 44, 46 to be closely disposed to the cutting plane 83. The cooperating relationship between the inclined rollers 44, 46 and the tapered surface 86 enables the establishment of points A and B axially close to each other on opposite sides of the cutting plane 83 adjacent the cutter 62. It will be evident that, considering the mounting arrangement of the cutter support arm 54 on pivot shaft 56 and transverse pins 80 that, as viewed in FIG. 8, the cutter arm 54 can be axially traversed between end positions that are closely adjacent points A and B. The radial position of cutter 62 relative to points A and B, of course, will determine the depth of cut of cutter 62 into the surface of the workpiece 28. This is readily adjustable by moving the cutter holder 64 upwardly and downwardly as viewed in FIG. 7 to establish the relative location between the cutter 62 and the rollers 44, 46 when the arms 50, 52 and 54 are assembled in operative relationship.

It remains to be explained the manner in which the cutter support arm 54 can be caused to move the cutter 62 along the imaginary reference line 48 joining points A and B, as mentioned previously in connection with the discussion of FIGS. 4 and 5. In this preferred embodiment, this is accomplished by providing an axially extending link 88 connecting the guide support arms 50, 52 together at their distal end areas 90. The link 88 in this embodiment is a simple cylindrical rod connected to the guide support arms 50, 52 by universal type ball joint couplings 91 that enable each arm 50, 52 to radially pivot with respect to each other about pivot axis 66 (FIG. 6). Since the ends of the link 88 are connected directly to ends 90 of guide support arms 50, 52, the inclination of link 88 will always follow, and be proportional to, the inclination of the imaginary line 48 joining points A and B in the peripheral surface of workpiece 28. Depending upon the distance between the centerline of link 88 and axis 66 as compared with the distance between the axes of guide rollers 44, 46 and axis 66, the angle of inclination of link 88 relative to the longitudinal axis of the workpiece 28 will be directly related to the angle of inclination of line 48 extending between points of contact A and B between guide rollers 44, 46 and the peripheral surface of workpiece 28.

The guide support arm 54 is connected to the link 88 so that it slides along a feed guide surface comprising the outer surface of the link 88 by means of a ball and socket coupling 94. As illustrated in FIG. 7, the ball and socket connection 94 is attached to the cutter support arm 54 through a slip joint assembly comprising a plate 96 slidably mounted in the cutter support arm 54 through a slip joint that permits the plate 96 to slide transversely from left to right as viewed in FIG. 7, within the general plane of the cutter support arm.

Accordingly, the distal end area of the cutter support arm 54 is connected to the link 88 for sliding motion by the sliding ball and socket joint connection 94 so that, when the cutter support arm 54 is axially pivoted about axis 82 on pins 80 to cause axial feeding motion of the cutter 62 between the guide rollers 44, 46, the distal end of the arm 54 will precisely follow (in a proportional sense) the angle of inclination of the link 88 that is connected at its opposite end to the guide support arms 50, 52. The cutter 62, when it is axially fed by pivotal movement of the cutter support arm 54 about axis 82, will follow the imaginary reference line 48 connecting points A and B by reason of its interconnection with link 88 at its distal end. In this specific embodiment, the inclination of link 88 is directly related and proportional to the imaginary reference line 48 and will cause the cutter support arm 54 to track along a straight line that is parallel with reference line 48. However, it is within the scope of this invention to configure link 88 in any desired manner if it is desired to cause the cutter 62 to axially traverse a contour that is different from a straight line and which is in a different geometric relationship with the imaginary line 48. A person skilled in the art can readily observe that the particular contour of the feed guide surface (the surface of link 88, here) as well as the specific shape of link 88, can readily be adjusted to cause cutter 62 to traverse a different arc or path between points A and B as the distal end of the cutter support arm 54 is axially traversed between the guide rollers 44, 46. Of course, in all situations, the reference points A and B will always have a fixed geometric correlation with the radial location of the peripheral surface of a workpiece mounted on the tool and the link 88 will always be geometrically correlated with the position of points A and B, which are established by the points of contact between the rollers 44, 46 and the surface of the workpiece to be machined.

It is also contemplated within the scope of this invention that the specific layout of the cutter support arms 50, 52 and 54, as well as the rollers 44 and 46, can be arranged so that the internal peripheral surface of the tubular workpiece 28 can be engaged, with the establishment of points A and B axially along the interior periphery of the workpiece. The cutter 62, of course, would be located on the opposite side of the cutter support arm 54 as shown in FIG. 7, and other structural arrangements would be made to accommodate the interior location of the cutting assembly, all within the routine knowledge of a person skilled in the art pertaining to machine tools of this type.

Figure 9:
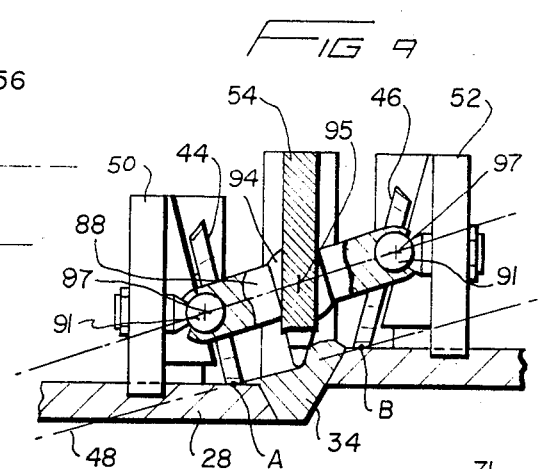
FIG. 9 is a partial cutaway, end view along approximately line IX—IX in FIG. 2, with certain details omitted for clarity.

A specific cutting operation is illustrated in FIG. 9 where the workpiece 28 comprises misaligned tubular sections similar to those illustrated at 32 in FIG. 4. Here, points A and B have been established on opposite sides of the cutting plane of the tool, which is located at the position of the cutter 52. The link 88 is shown inclined and pivoted about its ball connections with guide support arms 50, 52 so that it will guide the cutter 62 parallel to the imaginary reference line 48 connecting points A and B. The cutter support arm 54 has partly removed an irregularity comprising the crown of weldment 34 on the periphery of workpiece 28 and is following precisely an axial feed path determined by the inclination of link 88. The inclination of link 88 is determined by the relative radial positions of the guide rollers 44, 46 and, of necessity, the guide support arms 50, 52. As the cutter support arm 54 traverses towards the right as shown in FIG. 9, the resulting machined surface will smoothly connect points A and B entirely around the periphery of the workpiece, with virtually no removal of workpiece base material on either side of the weldment. It should also be noted that the rollers 44, 46 will precisely track the eccentricities between opposite sections of the workpiece 28 on either side of the cutting plane so that the resultant machined surface will continuously provide a smooth transition between the points of contact A and B between the rollers 44, 46 and the outer peripheral surface of the workpiece 28. Thus, the inclination of link 88 is never necessarily fixed in space but is permitted to continuously adjust itself in accordance with the radial locations of the points of contact A and B between the rollers 44, 46 and the workpiece.

Figure 16:
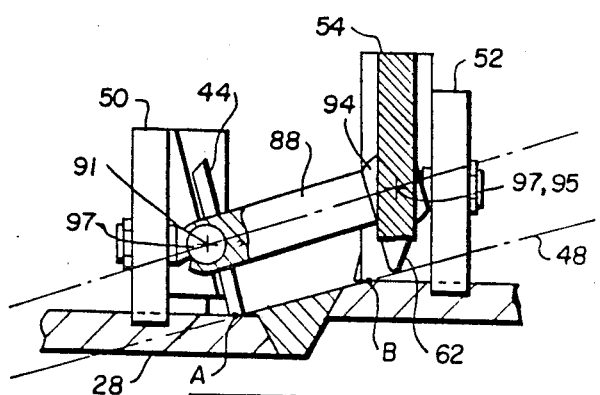
FIG. 16 is similar to FIG. 9, showing the cutter support arm at one extreme axial position.

The center of the ball element of the ball and socket connection 94 is indicated at 95 and the centers of the ball elements of the ball joint coupling 91 are indicated at 97. As shown in FIG. 16, when the cutter support arm 54 is driven in its extreme axial position along link 88, centers 95 and 97 are concentric adjacent the guide support arm 52 so that, in effect, radial movement of the opposite support arm 50 in response to guide roller motion will not affect the position of the cutter 62. When the cutter support arm 54 is located at its opposite extreme, a similar relationship will exist between the center points 95 and 97 adjacent support arm 50.

The axial feed system 84 used to axially advance the distal end of cutter support arm 54 along link 88 will now be described. The axial feed mechanism is generally indicated at 84 (see FIGS. 1 and 2 for a general view, and FIGS. 10, 11 and 12 for enlarged detail views). The axial feed mechanism 84 is intended to drive the cutter support arm 54 axially about pivot axis 82 to cause axial advancement of the cutter 62 along the workpiece. The axial feed mechanism 84 must accommodate radial pivotal movement of the cutter support arm 54 about axis 66, as the guide rollers 44, 46 follow eccentricities around the periphery of the workpiece.

Figure 12:
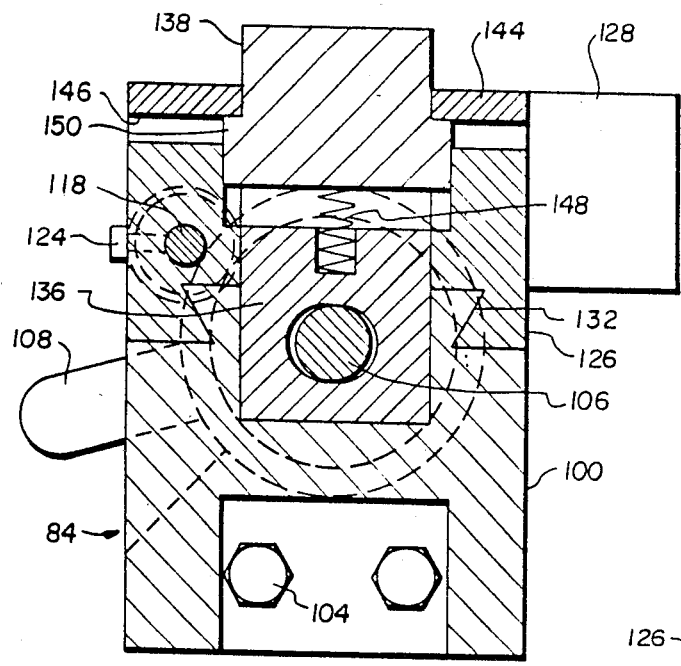
FIG. 12 is a sectional view taken along line XII—XII of FIG. 11.

As viewed in FIGS. 1, 11 and 12, the axial feed mechanism 84 comprises a base plate 100 that is affixed to the ring 14 by a mounting plate 102. The base plate 100 is attached to the mounting plate 102 by suitable fasteners, such as illustrated at 104. Thus, the axial feed mechanism 84 is driven orbitally around the tool rotary axis along with the pivot shaft 56, and the support arms 50, 52 and 54. However, the axial drive mechanism 84 does not follow any eccentricities of the workpiece, but is simply mounted in fixed relationship relative to ring 14, the same as in the case with the pivot shaft 56.

The base plate 100 is provided with a suitable mounting arrangement for supporting an axial feed screw 106 that is provided with both forward and reverse pitch helical threads schematically illustrated at 107 in FIG. 11. The feed screw 106 extends longitudinally along the base plate 100, as illustrated, and is caused to rotate by intermittent pivotal oscillating motion of the ratchet mechanism 108 which extends laterally from the axial feed mechanism to periodically engage a feed striker pin 110 (FIG. 1) mounted on the housing 12 of the tool. Thus, when ring 14 moves the feed mechanism past the striker pin 110 during each revolution of ring 14, the ratchet mechanism 108 is caused to pivot upwardly as shown in FIGS. 1 and 11 to thereby drive the feed screw 106 through an increment of rotation to advance the cutter axially along the workpiece by an appropriate amount.

The ratchet mechanism 108 is connected to the feed screw 106 through a feed clutch mechanism 112, which preferably comprises a Torrington FCB-20-type DC roller clutch or the substantial equivalent thereof. The clutch mechanism is simply a one-way clutch device that causes the pivotal movement of the ratchet mechanism 108 to be transmitted directly to the feed screw 106 when the ratchet 108 is pivoted in one direction (in this embodiment, upwardly as viewed in FIG. 11). However, reverse movement of the ratchet mechanism (in a downward sense, as viewed in FIG. 11) is not transmitted to the axial screw, but simply results in freewheeling of the clutch 112. Thus, as ring 14 rotates about tool axis 16, the ratchet 108 intermittently contacts the striker pin 110 to cause the ratchet mechanism 108 to pivot upwardly to drive the screw 106 an increment of rotation to cause axial feeding motion of the cutter support 54 in a manner to be described in more detail below. When the ratchet mechanism 108 moves beyond the striker pin 110, the ratchet mechanism is driven by a spring (not shown) to return to its original starting position shown in FIGS. 1 and 11. When the ratchet mechanism strikes the pin 110 on the next revolution of the ring 14, the motion is repeated, and continues until the cutting operation is completed or the feed movement is stopped.

To control the feed motion, as well as the incremental amount of feed motion during each revolution, the pin 110 preferably is made retractable so that, upon its retraction, the ratchet mechanism 108 is not activated while the ring 14 is rotated. In addition, an appropriate stop mechanism (not shown) is provided to limit the amount of return movement of the ratchet mechanism 108 to thereby limit the amount of its advance stroke each time it strikes pin 110. This features is not shown or described in further detail, since this detail per se does not constitute a part of the present invention.

As shown in FIG. 10, the feed clutch 112 is provided with a stop flange 114 which is secured to or is integral with the outer housing 116 of the feed clutch 112. The ratchet 108 is rigidly secured to the housing 116 of the clutch 112 so that, when the ratchet mechanism 108 oscillates about the axis of the feed screw, the stop flange 114 also follows this movement. The return movement of the ratchet mechanism and the stop flange 114 is caused by an internal spring within the clutch or other suitable biasing arrangement (not illustrated) so that the position of the ratchet 108 is normally constantly biased by the spring towards the starting position shown in FIGS. 1 and 12.

It will be evident that any influences on the housing 116 of the clutch 112 that would prevent return movement of the ratchet 108 to its starting position would prevent the ratchet 108 from striking the pin 110 and would prevent further feeding movement of the feed screw 106. The present invention contemplates controlling the feed advancing movement of the feed screw 106 by preventing return movement of the ratchet mechanism 108 to a starting position, whereby, upon axial feeding motion reaching a limit point, the ratchet 108 is held in a fully rotated position so that it bypasses the striker pin 110 upon each rotation of the ring 14.

The device utilized for limiting movement of the axial feed screw 106 beyond a set limit comprises a stop shaft 118 slidably mounted on the base plate 100 so that it can axially move slightly along its length (see FIG. 11) in either direction. The stop shaft 118 is furthermore provided with stop shoes 120 located on opposite sides of the stop flange 114 on the clutch 112. A slight clearance is normally provided between the shoes 120 mounted on shaft 118 and the flange 114, so that pivotal movement of the ratchet mechanism 108 is normally restrained by the shoes 120. However, it can be observed that, if shaft 118 is moved in either direction along its length relative to the base plate 100, it will exert a braking effect on the flange 114 to prevent return movement of the ratchet mechanism 108. Axial movement of the shaft 118 is achieved by using adjustable feed stops 122 mounted on the shaft 118 by suitable set screws 124 so that the spacing of the stops 122 can be adjusted along the length of shaft 118. Thus, when the axial feed block 126 (to be described below) is moved along the base plate 100 by the feed screw 106 in response to intermittent pivotal movement of the ratchet mechanism 108 and the transmittal thereto of rotary feed motion via the feed clutch 112, one or the other of feed stops 122 will be engaged to move the shaft 118 axially to cause a braking effect on the flange 114 to lock the feed mechanism in a non-feed position during rotation of ring 14.

Axial feeding motion from the feed screw 106 is transmitted to the cutter support arm 54 by means of the feed block 126 that engages the cutter support arm 54 by means of a sliding joint connection comprising a slot 128 in the feed block 126 and the distal end 130 of cutter support arm 54. The distal end 130 of the cutter support arm 54 may be provided with a suitable hardened pin or other surface to provide a driving connection with the slot 128 in the block 126 during operation of the tool.

The feed block 126 is mounted on the base plate 100 by a dovetail sliding connection 132, as shown in FIG. 12. The side of the feed block 126 facing the cutter support arm 54 is provided with a bifurcated area to produce a slot 128 for engaging the distal end 130 of the cutter support arm 54.

Extending vertically through the feed block 126 is a drive clutch arrangement 134 comprising a rotatable feed nut 136 and a locking detent 138.

Figure 14:
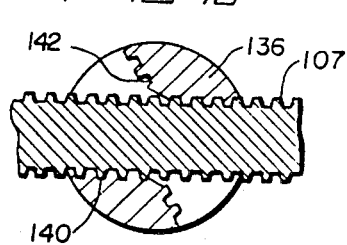
FIGS. 14 and 15 show opposite positions of the feed drive clutch element of the present invention used to selectively cause the cutter to move in a forward or reverse direction without reversing the direction of rotation of the feed screw, or to permit the feed screw to disengage the feed block.
Figure 15:
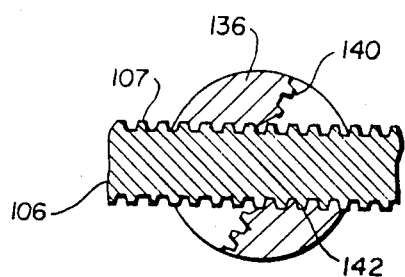

As seen in FIGS. 15 and 14, the feed nut 136 is rotatable between two end positions, and a central intermediate position as shown in FIG. 11. The feed nut 136 is provided with two sets of threads 140, 142 that are of opposite pitch. As described previously, the axial feed screw 106 is provided with screw threads 107 that are opposite in pitch so that a feed nut can selectively be meshed with one set of threads to cause axial feed motion of the feed block 126 in a forward direction, or with the other set of threads to cause reverse motion of the feed block, all while the feed screw 106 is rotated in a single direction.

The feed nut 136 with its associated drive clutch 134 permits the feed nut to engage either set of threads 107 or to engage none of the threads whatsoever in a neutral, central position as shown in FIG. 11. When the feed nut 136 is rotated in either direction away from its central position, either thread 140 or 142 will engage the corresponding threads 107 on the feed screw 106 to cause axial, rectilinear movement of the feed block 126 along the dovetail slide 132. Depending upon which of the threads 140, 142 are engaged with the threads 107 on the feed screw 106, the feed block will move either forwardly away from ring 14, or rearwardly towards the ring.

Figure 13:
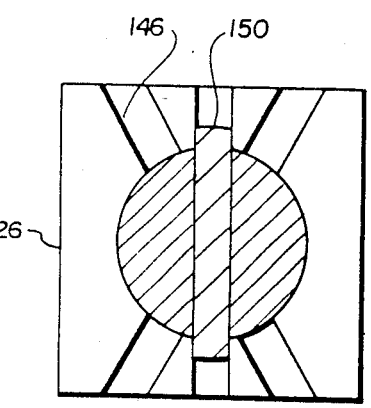
FIG. 13 is a section view taken along line XIII—XIII of FIG. 10.

The locking detent 138 of the drive clutch 134 is best illustrated in FIGS. 13, 11 and 12. The upper portion of the feed block 126 includes a cap 144 having three transverse sets of notches 146 against which the locking detent 138 is upwardly biased by spring 148. The locking detent 138 is provided with transverse keys 150 that mate with the notches 146 when the keys and notches are aligned with each other. Thus, an operator can grasp the upper exposed end of the detent 138 extending above the cap 144 of the feed block 126, and, by depressing same against the upward bias of 148, can rotate the feed nut 136 to any of three positions: the central position shown in FIGS. 10, 11 and 12; a second position shown in FIG. 14; and still a third position shown in FIG. 15. The rotary position of the feed nut 136 will be secured when the upper portion of the detent 138 is released and when the keys 150 are aligned with an opposed set of notches 146 beneath the cap 144.

The operation of the feed mechanism 84 will now be explained. Assuming that the feed striker pin 110 is in the extended position, ready for engagement by the ratchet mechanism 108, rotary movement of ring 14 with the cutter support arm 54 and the guide support arms 50, 52 in position in FIGS. 1 and 2, will cause the ratchet 108 to strike the pin 110 once each revolution of the ring to cause the feed screw 106 to rotate through a predetermined increment of rotation, depending upon the adjustment made to govern the return stroke of the ratchet mechanism 108. Rotation of the feed screw 106 will cause forward advancement of the feed block 126 if the feed nut has been rotated to cause engagement between its threads 140 (or 142, depending upon the specific pitch of the threads) with the threads 107 of the feed screw 106. The feed block will thus be incrementally moved to cause axial feeding motion of the cutter support arm 54 within the range of movement of the feed block 126. Axial movement of the block 126 will cause the distal end 130 of arm 54 to move axially along the link 88 to cause the ball socket joint 94 to follow a guide surface 92, as explained previously in connection with the illustration as FIG. 2.

When the feed block 126 reaches the stop 122 at the right in FIG. 11, the stop shaft 118 will be caused to axially reciprocate to effect engagement between one of the stop shoes 120 and the stop flange 114 on the feed clutch housing 116. The frictional engagement of one of the shoes 120 with the flange 114 will prevent return movement of the ratchet mechanism 108 to effectively prevent its contact with the striker pin 110 to stop advancement of the feed screw 106. The machine operator may then reverse the position of the feed nut 136 to cause engagement between its other set of threads and the threads 107 of the feed screw 106 and will release the holding force of stop shaft 118 to enable the shoe 120 to disengage the flange 114. The axial feed mechanism 84 is now set for reverse feed of the cutter support arm 54 in an axial direction opposite to that of its initial feed motion. Upon resumption of rotation of ring 14, intermittent rotation of feed screw 106 in the same sense as its previous rotation will cause reverse movement of the feed block 126 towards the opposite stop 122. When the feed block 126 engages and moves the opposing feed block 122, the same action as previously described will occur between one of the shoes and the flange 114 on the feed clutch 112 to cease further axial feeding motion of the feed block 126. If it is desired at any time to release the engagement between the feed block 126 and the feed screw 106, the locking detent 138 can be moved to its central, non-driving position to permit free sliding movement of the block 126 along the dovetail slide 132.

Due to the sliding joint connection between the distal end 130 of the cutter support arm 54 and the slot 128, the end 130 of the arm 54 can follow an arc about axis 82 (FIG. 2) while cutter support arm 54 is pivoted axially about axis 82. Moreover, this sliding joint connection permits radial movement (upwardly and downwardly as viewed in FIG. 1) between the end 130 and the slot 128. In the manner previously described, the sliding action of the ball connection 94 and the slip joint 96 also provide certain freedom of movement of the cutter support arm 54 while nevertheless causing the cutter 62 to axially and radially traverse the imaginary reference line 48 established between points A and B on the peripheral surface of the workpiece, all as previously described.

The overall operation of the tool will now be described in the context of removal of the crown of a weldment made between workpiece sections that are eccentrically aligned with respect to each other. After the workpiece is placed in the tool and fixed relative thereto, the guide roller support arms 50 and 52 are adjusted so that points A and B are located close to opposite sides of the weldment crown to be removed. The cutter 62 is then adjusted so that its depth of cut is proper relative to the points of the guide rollers 44, 46 and relative to the surface of the workpiece. The axial feed mechanism is then connected to the distal end of the cutter support arm 54. The starting position of the cutting operation is established and the ring 14 is then rotated by the motor 22. The rollers 44, 46 will track the workpiece in substantially a single transverse, radial plane and the cutter support arm 54 will remain in its starting position adjacent one of the guide rollers 44, 46 until the axial feed mechanism 84 is activated. Upon actuation of the axial feed drive, intermittent pivotal movement of the ratchet 108 and the corresponding advancement of the axial feed screw 106 to move the feed block 126 rectilinearly in a direction substantially parallel to the rotary axis of the tool. Rectilinear movement of the feed block 126 is imparted to the distal end 130 of the cutter support arm 54, while the sliding joint connection between the end 130 and the slot 128 in the feed block 126 accommodates the radial movement of the end 130 of the cutter support arm 54. Meanwhile, the ball joint and slip joint connections 94, 96 between the link 88 and the cutter support arm 54 accommodate the slight arc of travel of the distal end area of the support arm 54 while causing the same to precisely track the inclination of the link 88. The entire assembly of the arms 50, 52 and 54 can axially pivot about the pivot shaft 56 (about axis 66) while the guide rollers 44, 46 individually follow eccentricities about the peripheral surface of the workpiece 28. The motion of the assembly of the arms 50, 52 and 54 may be damped by the friction damper 74, or any other appropriate means appropriate for the motions anticipated.

The guide support arms 50, 52 preferably are biased by a set of springs 152 that urge the arms, including the cutter 62, towards the surface of the workpiece and, in the preferred embodiment illustrated, tend to move the arms toward the rotary axis 16 of the tool.

While the above description describes a preferred embodiment of the invention, it is to be clearly understood that various other embodiments of the invention could be envisioned and put into practice by a person skilled in the art without departing from the scope of the inventive concepts herein disclosed and claimed. For example, as previously mentioned, the arms 50, 52 and 54 could be arranged so that the guide rollers engage an inner peripheral surface of a hollow workpiece instead of an outer surface. Moreover, while a circular workpiece and a circular ring 14 have been described as comprising the preferred embodiment, the tool could be arranged so that the cutter moves along a non-circular path about an axis of symmetry or along a different desired path.

While the preferred embodiment has been described in the context of a workpiece held fixed within an annular portion of the tool housing, the inventive concept could just as well be applied in a situation where the cutter and the guide rollers are maintained in a single position, while the workpiece is rotated within the tool housing and past the cutter location. Moreover, the specific arrangement of the chordwise extending support arms 50, 52 and 54 could be modified appropriately by a person skilled in the art so that the establishment of the reference points A and B, as well as the imaginary line 48, could be accomplished with the guide rollers and the cutter precisely following the surface of the workpiece in the manner illustrated in FIG. 9.

Although, in the preferred embodiment, the guides for establishing reference points A and B are illustrated as comprising roller elements, it is to be understood that any suitable feeler device could be utilized, as long as it was capable of tracking the surface of the workpiece on opposite sides of the axial irregularity to be removed from the workpiece surface. Moreover, the specific mounting and pivoting arrangement for the support arms 50, 52 and 54 could be altered in any suitable manner, so long as the relationships between the various pivoting axes were maintained to ensure that the reference points A and B, the imaginary reference line 48, the location of the cutting plane, and the location of the cutting tool all are maintained in suitable cooperative relationship.

While an axial feed mechanism in accordance with the preferred embodiment has been described, it should be understood that any suitable device could also be used to advance the cutter axially along the imaginary reference line. For example, the axial feed mechanism 84 could be located on the opposite side of the pivot shaft 56 and connected to the cutter support arm 54 by an extension of same extending away from the opposite side of the pivot shaft 56, in a direction away from the tool axis. The specific mounting arrangement for the support arms 50, 52 and 54 on the ring 14 could be altered in any suitable manner, include the use of a single mounting plate integral with or attached to the mounting plates 58 and 102 shown in FIG. 1.

The shape and configuration of the guide line 88 in the preferred embodiment is illustrated as a straight pin of fixed length. However, the pin could be of variable length and also could be arranged to have a variety of contours constituting the guide surface for the cutter support arm, whereby the motion of the cutter 62 between the reference points A and B in a radial plane could be altered to provide a different shape of the finished machined surface that is generated between reference points A and B. the specific arrangements illustrated for connecting the ends of link 88 to the support arms 50, 52 could be modified in accordance with principles well-known to those skilled in the art without modifying the basic inventive concept.

What is claimed is:

1. A rotary, lathe-type machine tool, including a tool housing, for removing material from the periphery of a generally cylindrical or tubular workpiece having an axially irregular peripheral contour by causing a cutter to circumscribe the periphery of such a workpiece in a cutting plane while the cutter is advanced axially along the workpiece, comprising:

means on the tool housing for locating and fixing a cylindrical or tubular workpiece having an irregular peripheral contour with respect to the tool so that the longitudinal axis of the workpiece is substantially concentric with the rotary axis of the tool and the material thereon to be removed lies generally in the range of movement of the cutting plane of the tool;

a cutter support means mounted on the housing including a cutter holder mounted on the cutter support means, said holder arranged to support a cutter in the cutting plane of the tool;

means on the tool for causing relative rotary motion between said cutter support means and said means for locating and fixing a workpiece, whereby said cutter holder follows a path circumscribing the periphery of such workpiece in or adjacent the cutting plane of the tool;

means associated with the cutter support means for independently establishing axially spaced reference points on opposite sides of and adjacent the cutting plane of the tool adjacent the cutter holder, said reference points having a fixed geometric correlation with the radial location of the peripheral surface of a located workpiece at each of said points; and means associated with the cutter support means for causing said cutter holder to axially traverse a cutting path extending substantially along an imaginary line extending between said reference points while said cutter and workpiece locating and fixing means are rotated relative to each other.

2. A machine tool as claimed in claim 1, said cutter support means arranged to be driven by the tool about a circular orbital path centered on the tool rotary axis, and comprising a cutter support arm extending parallel to a plane extending chordwise of the cutter support orbital path; cutter support pivot means for supporting the arm for axial and radial pivotal movement about a cutter support pivot point located at or near a proximal end portion of the arm and laterally of the tool rotary axis, said cutter support pivot means also driven by said tool about a circular orbital path centered on the tool rotary axis; said cutter holder disposed on the cutter support arm at a selected radius from said cutter support pivot point; said means for causing said cutter holder to axially traverse a cutting path comprising axial feed means connected to said arm for pivoting said arm about said first cutter support pivot point to move the cutter holder in a direction generally parallel to the tool rotary axis and along said line connecting said reference points.

3. A machine tool as claimed in claim 2, including indexing means for advancing said axial feed means and cutter support arm in synchronism with the orbital motion of said cutter support.

4. A machine tool as claimed in claim 3, said axial feed means connected to a distal end area of said arm, said cutter holder mounted on said arm intermediate said cutter support pivot point and the point of connection of said axial feed means with the arm.

5. A machine tool as claimed in claim 4, said axial feed means including an axially moving feed block, and including a sliding joint connection between said distal end area of said arm and said feed block, whereby axial motion of the feed block is accommodated while the distal end area of the arm traverses radial and axial arcs centered at said cutter support pivot point.

6. A machine tool as claimed in claim 5, including biasing means for urging said cutter support arm to pivot radially about said cutter support pivot point in a direction towards the periphery of a located workpiece.

7. A machine tool as claimed in claim 1, said means for independently establishing spaced reference points on opposite sides of and adjacent the cutting plane comprising axially spaced guide elements having contact regions continuously engageable with the periphery of the surface of a located workpiece while the workpiece and tool are rotated relative to each other; axially spaced independent support means for said guide elements; said means for causing said cutter holder to axially traverse a cutting path comprising a link connecting said guide support means and including a feed guide surface oriented in predetermined geometric relationship with respect to said reference line; said means for causing said cutter holder to axially traverse a cutting path comprising feed means for moving said cutter support means along said feed guide surface.

8. A machine tool as claimed in claim 7, including means for varying the axial spacing of said guide elements.

9. A machine tool as claimed in claim 7, said guide elements comprising at least a pair of rollers having identical diameters mounted for rotation around generally axially extending axes; said contact regions comprising the periphery of each roller; said imaginary reference line comprising the points of intersection between each roller and the periphery of a located workpiece.

10. A machine tool as claimed in claim 7, said axially spaced guide support means comprising axially spaced guide support arms extending parallel to a plane extending chordwise of the circular path of relative rotary motion between the periphery of a located workpiece and the cutter holder; said guide support means each independently mounted at proximal end regions on a guide pivot that follows a circular path of motion relative to the tool rotary axis for enabling radial movement of said guide support arms about a common, longitudinally extending first guide pivot axis extending parallel to and spaced away from the tool rotational axis, whereby each guide element can independently move towards and away from the tool rotary axis by pivoting of each respective guide support arm about said common first guide pivot axis; said guide elements mounted on said guide support arms at a selected radius from the guide point axis corresponding to the approximate centerline position of the tool.

11. A machine tool as claimed in claim 10, said link extending generally axially between said guide support arms at a distal location spaced away from said first guide pivot axis, said link establishing the axial spacing of the guide support arms at such location.

12. A machine tool as claimed in claim 11, said guide elements located between said link and said guide pivot axis.

13. A machine tool as claimed in claim 12, said link connected to said guide support arms by universal joints that enable relative angulation between the arms and the link when the arms independently pivot about said first guide pivot axis.

14. A machine tool as claimed in claim 13, including means for mounting each guide support arm on its respective guide pivot so that it can be axially pivoted about a second guide pivot axis extending normal to and intersecting the first guide pivot axis, the second guide pivot axis mounting means arranged so as to permit individual axial pivotal movement of the guide support arms to vary the axial distance between the guide support arms to thereby vary the longitudinal spacing between the guide elements.

15. A machine tool as claimed in claim 14, said feed means comprising a feed slider mounted to said link for movement axially along said feed guide surface; a slip joint means connecting said feed slider to said cutter support; and feed drive means connected to said feed slider for effecting axial movement of said slider along said feed guide surface; said support transmitting axial feed motion of said feed drive to said cutter support means while permitting said cutter support to follow a radial inclination of said feed guide surface.

16. A machine tool as claimed in claim 15, said cutter support means comprising a cutter support arm extending generally parallel to and coextensive with said guide support arms and connected at a proximal end region to a cutter support pivot for enabling radial pivotal movement of said cutter support arm towards and away from the rotary axis of the tool about a cutter support first pivot axis concentric with said first guide pivot axis, said cutter support holder disposed on said cutter support arm at a radius from said cutter support arm first pivot axis substantially corresponding to the radius between said first guide pivot axis and said guide elements.

17. A machine tool as claimed in claim 16, said cutter support pivot also arranged to permit axial pivotal movement of said cutter support arm about a cutter support second pivot axis extending perpendicular to and intersecting said cutter support first pivot axis so that the cutter holder can axially traverse said cutting path by pivotal movement of said cutter support arm about said cutter support first and second pivot axis.

18. A machine tool as claimed in claim 17, said feed means including a feed drive means including means for advancing said feed drive in synchronism with the relative rotary motion between the periphery of a located workpiece and the cutter holder, and a feed drive clutch means for selectively coupling or uncoupling the feed drive to the cutter support.

19. A machine tool as claimed in claim 17, said feed means including a feed block mounted on the tool housing and arranged to move rectilinearly parallel to the tool rotary axis, said feed block connected to said cutter support arm by a universal coupling that permits radial and axial pivotal movement of said cutter support arm while without interference with the rectilinear movement of said feed block.

20. A machine tool as claimed in claim 19, said universal coupling comprising a sliding joint connection between said arm and said block for permitting radial pivotal motion of said arm relative to said rectilinearly movable block; and a separate combination ball and socket joint with a sliding connection between said cutter support arm and said feed slider for permitting axial pivotal movement of said arm relative to said feed block.

21. A machine tool as claimed in claim 1, said cutter support means comprising a cutter support arm extending chordwise of the circular path of relative rotary motion between the periphery of a located workpiece and the cutter holder, said cutter support arm connected at a proximal end region to a cutter support pivot for enabling pivotal movement of the arm about a cutter support pivot axes located transversely of the rotary axis of the tool in or adjacent the cutting plane so that the arm can pivot both radially towards and away from the rotary axis of the tool and axially parallel to the tool rotary axis, said cutter holder disposed on said arm at a location spaced away from said cutter support pivot point at a radius lying on or adjacent the centerline of the tool so that combined radial and axial pivotal motion of said arm about said cutter support pivot point effects said axial cutting path traversal of said cutter along said reference line.

22. A machine tool as claimed in claim 21, said means for causing said cutter holder to traverse a cutting path along said reference line comprising cutter feed means connected to said cutter support arm for pivoting said arm about said cutter support pivot axes.

23. A machine tool as claimed in claim 22, said cutter feed means including a feed drive means and indexing means for advancing said feed drive means in synchronism with the relative rotary motion between the periphery of a located workpiece and the cutter holder.

24. A machine tool as claimed in claim 23, including a feed drive clutch for selectively coupling or uncoupling said feed drive means to or from said cutter support arm.

25. A machine tool as claimed in claim 22, said cutter feed means including a feed drive arranged on the tool to move a portion of said feed means rectilinearly parallel to the tool rotary axis, said feed means connected to a distal region of said arm spaced away from said cutter support pivot axes by a universal coupling that permits said radial and axial pivotal movement of the arm about said cutter support pivot axes without interferences with the rectilinear motion of said portion of said feed means.

26. A machine tool as claimed in claim 25, said universal coupling comprising a sliding joint connection between said cutter support arm and said rectilinearly movable portion of said cutter feed means for permitting radial motion of said arm relative to said portion of said feed means and a separate combination ball and socket with slip joint connection between said arm and said feed means for permitting non-interfering axial pivotal movement of said arm relative to said rectilinearly movable portion of said feed means.

27. A machine tool as claimed in claim 26, including a motion damper arranged to damp radial movement of said cutter support arm during tool operation.

28. A machine tool as claimed in claim 1, including biasing means for resiliently urging said cutter support radially towards the peripheral surface of a located workpiece.

29. A machine tool as claimed in claim 1, including means for varying the longitudinal spacing of said reference points.

30. A machine tool as claimed in claim 1, said means for independently establishing said axially spaced reference points comprising at least a pair of guide elements movable towards and away from the rotary axis of the tool, and independent guide support means for connecting said guide elements to the housing for relative rotary motion with the cutter support means relative to said means for locating and fixing a workpiece.

31. A machine tool as claimed in claim 30, including means for varying the axial spacing of said guide elements.

32. A machine tool as claimed in claim 30, said cutter and guide element supports comprising coextensive arms extending chordwise of the arc of relative rotation between the cutter and a located workpiece, said arms attached at one end to the tool housing by a common pivot means so that they are all radially rotatable about a common pivot axis located eccentrically of the tool rotary axis.

33. A machine tool as claimed in claim 32, wherein said cutter support arm is attached to the common pivot means by a universal coupling that permits axial pivotal movement of said arm about a separate pivot axis intersecting said common axis.

34. A machine tool as claimed in claim 32, including motion damping means for damping radial motion of said arm.

35. A machine tool as claimed in claim 32, including biasing means attached said cutter support means for resiliently urging said radially towards the peripheral surface of a located workpiece.

36. A machine tool as claimed in claim 35, said biasing means comprising a spring.

37. A machine tool as claimed in claim 33, wherein said means for causing said cutter holder to axially traverse a cutting path comprises axial feed means engaging a distal end region of the cutter support arm, said axial feed means including an axially extending axial feed drive screw, an axially movable feed block connected to the feed drive screw, indexing means for rotating the feed drive screw in synchronism with the tool relative rotation with respect to a located workpiece, and a universal coupling between the feed drive block and the cutter support arm for permitting simultaneous non-interfering axial advancement of the feed block, and axial and radial pivotal movement of the cutter support arm.

38. A machine tool as claimed in claim 37, including feed drive clutch means for disengaging the driving connected between the feed screw and the feed block.

39. A machine tool as claimed in claim 38, said feed screw including forward and reverse pitch feed threads; means for selectively connecting the feed block to either of the feed threads for rotating in a single direction, and effecting forward and reverse feed movement of said feed block.

40. A machine tool as claimed in claim 39, including automatic axial feed stop means for stopping axial feed motion of the feed block at a pre-selected axial travel limit position of the feed block.

41. A machine tool as claimed in claim 40, said axial stop means connected to said indexing means so as to render the latter inoperative when said axial feed stop means senses said limit positions.

42. A machine tool as claimed in claim 32, said guide elements comprising rollers having peripheries engageable with the peripheral surface of a located workpiece, said rollers supported on said guide support arms for rotation about generally axially extending axes.

43. A machine tool as claimed in claim 42, said cutter support arm located between said guide support arms with the cutter holder closely adjacent the peripheries of said rollers, said rollers comprising discs mounted on said guide support arms, the discs mounted on inclined axes so that their peripheral areas in contact with a located workpiece are closer to the cutting plane than the diametrically opposite sides of the discs.

44. A machine tool as claimed in claim 43, said discs having flat sides facing the cutter holder, said cutter holder having flat, radially tapered opposite sides facing the flat sides of the discs and extending substantially parallel thereto.

45. A method for machining a peripheral surface of a cylindrical or tubular workpiece to remove an axially irregular portion of such surface using a rotary, lathe-type machine tool including an axially movable cutter arranged to circumscribe the peripheral surface of the workpiece in a transverse cutting plane located at the axial position of the cutter, comprising:
  (a) mounting the workpiece on the tool with the cutting plane on one side of the irregular peripheral surface portion;
  (b) establishing two axially spaced independent reference points having a fixed geometric correlation with the radial location of the peripheral surface of the workpiece on opposite sides of the axially irregular peripheral portion and on opposite sides of the cutter location;
  (c) causing the cutter to substantially axially traverse an imaginary line connecting said reference points while circumscribing the workpiece peripheral surface in cutting relationship, with the position of said axially spaced reference points maintained on opposite axially spaced sides of the cutter location.

46. A method as claimed in claim 45, including mounting the cutter on a support arm pivotally attached to the tool and extending parallel to a plane extending chordwise of the workpiece diameter, and causing said traversal of the cutter substantially along the reference line by axially pivoting the arm about its pivot.

47. A feed mechanism for advancing a machine tool element, for example a cutter, comprising:
  a base plate;
  a feed block assembly including means for slidably connecting the assembly to the base plate for reversing longitudinal movement therealong;
  a rotatable feed screw having oppositely pitched threads thereon mounted on the base plate and extending longitudinally through the feed block assembly;
  means for driving the feed screw in a single direction of rotation in synchronism with tool motion during tool operation;
  said feed block assembly including a movable feed drive clutch means including two separate threaded sections having opposite pitch threads corresponding with the respective opposite pitch threads of the drive screw and capable of cooperation therewith;
  said feed drive clutch means mounted on said feed block so as to be intersected by said feed screw, and including movable drive selector means for enabling adjustment of the position of the feed clutch means so that either of said sections of threads are engaged with said feed screw, but not both sections simultaneously.

48. A feed mechanism as claimed in claim 47, said feed drive clutch means including a third unthreaded section, said drive selector movable to a position where said drive screw intersects said third section and for effectively disengaging the feed screw from the block.

49. A feed mechanism as claimed in claim 48, including means for positively locking said feed drive clutch means in any single position where the screw intersects one of said three sections.

50. A feed mechanism as claimed in claim 47, said means for driving said feed screw in a single direction of rotation comprising a rotary feed drive means that drives the feed screw when it rotates; a braking surface attached to the feed drive means; a feed drive brake for engaging said braking surface; a limit stop means connected to the feed drive brake and engageable by the feed block when it slides along said base plate; said feed block moving said limit stop to urge said brake into engagement with said brake surface when the feed block is driven past the position of the limit stop means to thereby stop rotary motion of the feed drive means.

51. A machine tool as claimed in claim 13, said universal joints comprising ball and socket connections each having a center of curvature about which the link and guide support arms can pivot with respect to each other; said means for causing said cutter holder to axially traverse a cutting path further comprising a support for the cutter holder; a pivoting and sliding connection means between the cutter holder support and the feed guide surface of said link, whereby the cutter holder support can slide along the feed guide surface of said link while the link can pivot relative to the cutter holder support, said pivoting and sliding connecting means having a pivoting center about which the link and the cutter holder support can pivot relative to each other; said cutter holder support, link, ball and socket connections, and pivoting and sliding connection all being arranged so that when the pivoting and sliding connection is at its end position of travel at either end of the feed guide surface of the link, the centers of curvature of the ball and socket connections and the pivoting and sliding connection are substantially coincident with each other; and means for driving the cutter holder support along the length of the feed guide surface of said link.

* * * * *